United States Patent [19]

Ho et al.

[11] Patent Number: 4,845,348

[45] Date of Patent: Jul. 4, 1989

[54] METHOD AND APPARATUS FOR READING BAR CODE MAGNETIC INK CHARACTERS

[75] Inventors: Benedict C. M. Ho, Waterloo; Gene R. Franklin, Kitchener, both of Canada

[73] Assignee: NCR Corporation, Dayton, Ohio

[21] Appl. No.: 209,125

[22] Filed: Jun. 20, 1988

[51] Int. Cl.⁴ .............................................. G06K 7/08
[52] U.S. Cl. ...................................... 235/449; 235/463
[58] Field of Search ................................ 235/449, 463

[56] References Cited

U.S. PATENT DOCUMENTS

| | | | |
|---|---|---|---|
| 3,538,500 | 11/1970 | Hanchett, Jr. et al. | 340/146.3 |
| 3,761,685 | 9/1973 | Alpert et al. | 235/61.11 |
| 3,818,446 | 6/1974 | Benson | 340/146.3 |
| 3,879,707 | 4/1975 | Rohrer | 340/146.3 |
| 4,053,737 | 10/1977 | Lafevers et al. | 235/61.11 |
| 4,379,224 | 4/1983 | Angstrom | 235/463 |
| 4,533,825 | 8/1985 | Yamada | 235/463 |
| 4,584,703 | 4/1986 | Hallberg | 382/50 |

*Primary Examiner*—Harold I. Pitts
*Attorney, Agent, or Firm*—Wilbert Hawk, Jr.; Albert L. Sessler, Jr.; Elmer Wargo

[57] ABSTRACT

A method and system for use in reading magnetic characters comprised of bars and intervals dimensioned as short intervals or long intervals as is done in CMCs7 encoding. The interval between adjacent bars of a character is obtained by calculating the zero crossing point between a peak of a first polarity and a peak of a second polarity associated with a "bar" in the associated scanning signal. The zero crossing point may be compared to the midpoint of the associated "bar". The intervals are then determined by obtaining the distance or interval between the zero crossing points of adjacent "bars".

12 Claims, 6 Drawing Sheets

| ARRAY | | |
|---|---|---|
| LOCATION | COUNT (DISPLACEMENT FROM PREVIOUS PEAK) | VALUE (OF THE PEAK) |
| x | 2A (HEX) | 23 (HEX) |
| y | QA (HEX) | C0 (HEX) |
| z | 08 (HEX) | 36 (HEX) |

METHOD AND APPARATUS FOR READING BAR CODE MAGNETIC INK CHARACTERS

BACKGROUND OF THE INVENTION

This invention relates to a method and apparatus for reading bar code magnetic ink characters which employ a combination of inked bars which are separated by non-inked intervals of varying widths as is done in CMC7 coding, for example.

With coding schemes like the one mentioned, correct reading of a character depends upon accurately detecting and classifying the "white" intervals or spaces between the inked-bars as being "long" or "short" intervals. For example, in CMC7 coding, each character is made up of a combination of seven, vertically-positioned or parallel inked bars of constant width and six non-inked intervals (white spaces) of varying widths located between the inked bars. A character always starts and ends with a black or inked bar, and the character is designed to be human readable in addition to being machine readable.

Some of the factors which cause a reject or misread during machine reading of the characters relate to poor printing of the characters (like broken or "void" bars, or ink spatter), electronically noisy environments (like an electric motor), or variations in the speed at which the characters to be read are moved past an associated read head.

One of the ways in which CMC7 characters are read, for example, is to measure the distance between the trailing edge of one inked bar and the trailing edge of the next inked bar. Because the inked bars are designed to have a constant width, the spacing or interval is obtained by "subtracting", for example, the width of an inked bar from the distance measured. The resulting distance is a measure of the white space or "interval". This interval is then determined to be "long" or "short". The interval could also be considered to include the width of one bar. By examining the pattern of inked bar, long or short interval, inked bar, long or short interval, etc., a character is recognized. For the CMC7 coding mentioned, for example, there are seven inked bars, two wide or long intervals, and four narrow or short intervals used in a predetermined combination for each character.

One of the problems with the prior art method of reading characters described in the previous paragraph relates to noise spikes which occur in reading transition areas. A positive transition area occurs in going from a white interval to an inked bar, for example, while a negative transition area occurs in going from an inked bar to a white interval. The problem mentioned occurs when a noise spike is construed as a negative going signal, thereby distorting the interval between two adjacent inked bars. Such a noise spike might be interpreted as making the interval between two successive bars longer than intended, thereby causing a reject or a misread to occur.

SUMMARY OF THE INVENTION

In contrast with problems discussed in relation to prior art magnetic ink bar code readers, the method and apparatus of this invention utilize the midpoint of an inked bar to the midpoint of an adjacent inked bar for determining the space or interval between the adjacent inked bars.

In one aspect, the preferred method according to this invention may be used in a system for recognizing characters with each character having a predetermined number of parallel bars separated by intervals dimensioned as long and short intervals according to a predetermined pattern. The preferred method relates to determining the widths of said intervals for use in character recognition, comprising the steps: (a) scanning said characters in a direction which is substantially perpendicular to said parallel bars for producing a scanning signal having a first polarity when the scanning means scans the leading edge of each of said bars, and also for producing a scanning signal having a second polarity when the scanning means scans the trailing edge of each of said bars; (b) determining peaks in said scanning signals of said first and and second polarities; (c) determining a zero crossing point between a said peak of said first polarity in a scanning signal and a said peak of said second polarity in the scanning signal associated with each one of said bars for a character; and (d) measuring the intervals between the zero crossing points of said bars to determine whether a long or short interval exists between the parallel bars making up a character.

In another aspect, the preferred method according to this invention may be used in a system for recognizing characters with each character having a predetermined number of parallel bars separated by intervals dimensioned as long and short intervals according to a predetermined pattern. The preferred method relates to determining the widths of said intervals for use in character recognition, comprising the steps: (a) scanning said characters in a direction which is substantially perpendicular to said parallel bars for producing a scanning signal having a first polarity when the scanning means scans the leading edge of each of said bars, and also for producing a scanning signal having a second polarity when the scanning means scans the trailing edge of each of said bars; (b) determining peaks in said scanning signals of said first and and second polarities; (c) determining a zero crossing point between a said peak of said first polarity in a scanning signal and a said peak of said second polarity in the scanning signal associated with each one of said bars for a character; (d) measuring the intervals between the zero crossing points of said bars to determine whether a long or short interval exists between the parallel bars making up a character; (e) rejecting those characters whose intervals cannot be determined by steps c and d; (f) measuring the intervals between the trailing edge of one bar and the trailing edge of the next adjacent bar for those bars associated with a character rejected at step e to determine whether a long or short interval exists between the parallel bars making up the rejected character from step e.

In yet another aspect, the apparatus of this invention may be used in a system for recognizing characters with each character having a predetermined number of parallel bars separated by intervals dimensioned as long and short intervals according to a predetermined pattern. The apparatus for determining the width of said intervals for use in character recognition comprises: scanning means for scanning said characters in a direction which is substantially perpendicular to said parallel bars for producing a scanning signal having a first polarity when the scanning means scans the leading edge of each of said bars, and also for producing a scanning signal having a second polarity when the scanning means scans the trailing edge of each of said bars; first means for determining peaks in said scanning signals of said first and and second polarities; second means for determining a zero crossing point between a said peak of said first polarity in a scanning signal and a said peak of said second polarity in the scanning signal associated with each one of said bars for a character; and third means for measuring the intervals between the zero crossing points of said bars to determine whether a long or short interval exists between the parallel bars making up a character.

This invention is relatively simple to implement, and it is low in cost to manufacture. These advantages and others will become more apparent in connection with the following description, claims and drawing.

DETAILED DESCRIPTION OF THE INVENTION

Figure 1:
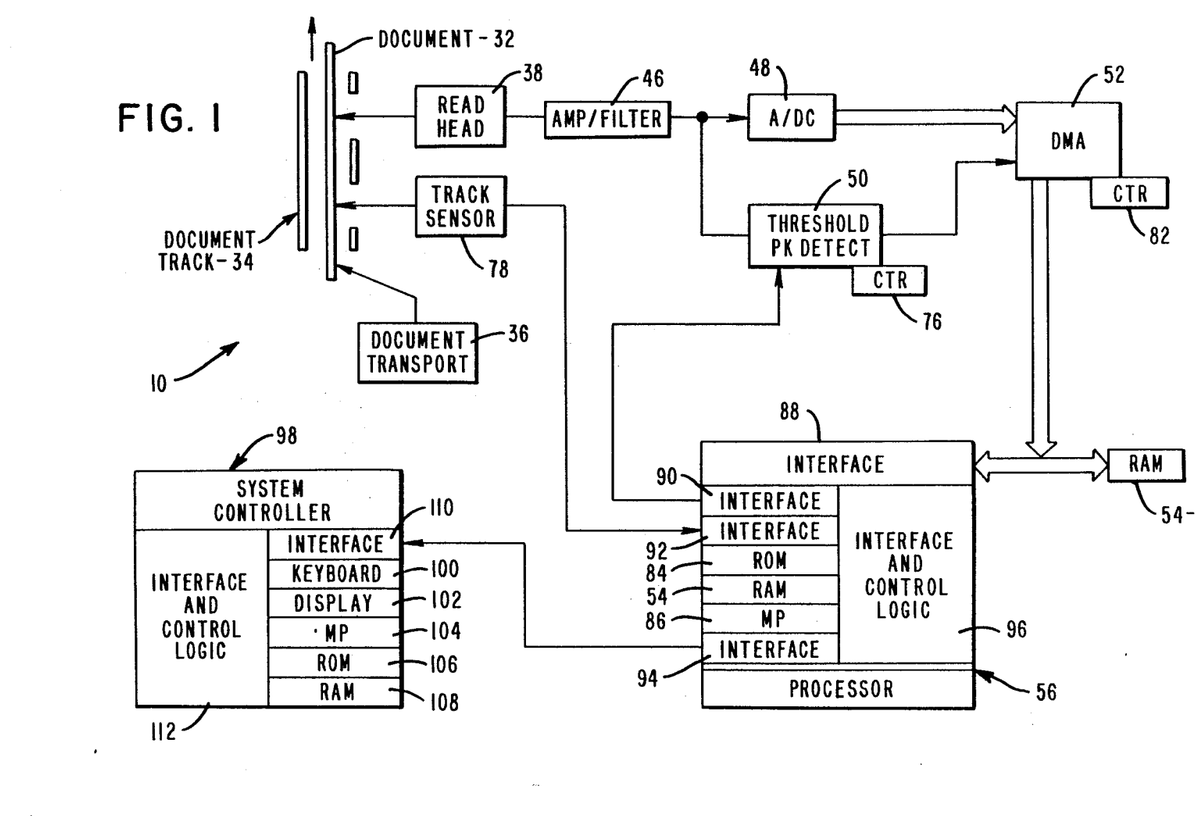
FIG. 1 is a general schematic diagram showing a system for recognizing bar coded characters.

FIG. 1 is a general schematic diagram showing a system 10 for recognizing bar code magnetic ink characters composed of a plurality of bars separated by long and short intervals in a predetermined pattern for each character to be recognized. However, before describing the system 10, it appears appropriate to describe the coding system used for the characters to be read.

Figure 2:
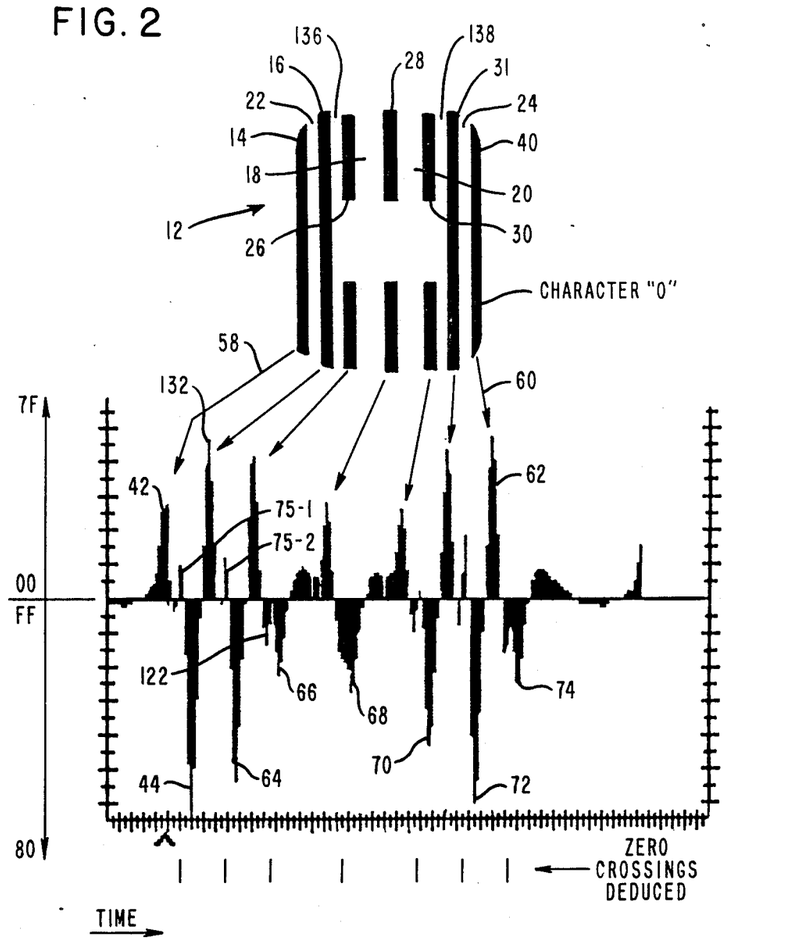
FIG. 2 is diagram showing a coded character and the various waveforms associated with it.

FIG. 2 shows shows how a character 12, like the number "0", is coded according to a predetermined pattern. In the embodiment selected to portray the invention, the particular code selected is referred to as a CMC7 code, although the principles of this invention may be used with codes other than the one being described. Each character in CMC7 is comprised of seven "bars", like 14 and 16, which are formed in magnetic ink, for example, and is also comprised of six spaces or intervals which are located between the bars. There are always two wide spaces or wide intervals, like 18 and 20, and four narrow spaces or narrow intervals, like 22 and 24, for example, for each character coded. The bars like 26, 28, and 30 are discontinuous in the vertical direction, as shown in FIG. 2, so as to make the character 12 human readable as a "0". The bars, like 14 and 16 for each character 12, are all substantially parallel to one another as shown. Only the character "0" is shown because the coding scheme described is a common one.

The characters, like the character 12 shown in FIG. 2, are generally printed on a carrier like a document 32 shown in FIG. 1, although the characters may appear on different carriers. The CMC7 coding mentioned is generally used on financial documents by European banks, for example. The account numbers, bank numbers, and monetary amounts on documents, like checks, for example, are coded in the CMC7 font.

When the characters on a document 32 are to be read, the document 32 is moved in a document track 34 (FIG. 1) by a conventional document transport 36. The document 32 is moved in operative relationship with a read head 38 so that the characters and the bars, like 14 and 40, for example, are positioned perpendicularly to the direction of scanning by the read head 38. The read head 38 is part of a scanning means which scans the bars, like 14 and 40, of a character in a direction which is substantially perpendicular to these parallel bars as stated. Assuming that the bar 14, shown in FIG. 2, is the first bar to be encountered by the read head 38, a scanning signal 42 of a first polarity will be generated when the read head 38 scans the leading edge of the bar 14. Correspondingly, a scanning signal 44 of a second polarity will be generated when the read head 38 scans the trailing edge of the bar 14. In the embodiment described, the scanning signal 42 of the first polarity is considered a positive-going signal, while the scanning signal 44 of the second polarity is considered a negative-going signal. This reading process is continued for each of the characters to be read, with the scanning signals of the first and second polarities being shown in FIG. 2 for the reading of the character "0". The range of values in the positive direction is shown as 00 to 7F (Hexadecimal), and the range of values in the negative direction is shown as FF to 80 (Hexadecimal).

The system 10 also includes a first means for determining the peaks in the scanning signals of the first and second polarities for the characters being read, with this first means comprising the amplifier/filter 46, an analog/digital converter (A/DC) 48, and the threshold and peak detector circuit 50. The general operation of the first means is as follows. As the scanning signals, like 42 and 44 for example, are generated, they are continuously amplified and filtered by the amplifier/filter 46 and are converted to digital values by the A/D converter 48. At the same time that this amplification and conversion is taking place, the threshold and peak detect circuit 50 continually looks for a peak (both positive and negative) within the amplified signals from the amplifier/filter 46. As soon as a peak is detected, the circuit 50 initiates an output signal which causes the Direct Memory Access circuit 52 (DMA) to store that particular peak's value in the RAM 54-1.

The RAM 54-1 (FIG. 1) may be part of the RAM 54 which is associated with the processor 56 or it may be a separate RAM associated with the DMA circuit 52. The use of the DMA circuit 52 frees the processor 56 to perform additional functions, as is typically done, while the DMA circuit 52 performs the addressing and filing functions to be later described herein.

Before discussing the system 10 in more detail, it appears beneficial to discuss some additional details related to the waveforms associated with the reading of the character 12 shown in FIG. 2. As previously stated, there are seven bars and six spaces or intervals comprising each character like the "0" shown in FIG. 2. The arrows like 58 and 60, coming from the bars 14 and 40, point to their associated scanning signals 42 and 62 of the first polarity. The remaining arrows between the arrows 58 and 60 similarly point to the scanning signals of the first polarity associated with the bars 16, 26, 28, 30, and 31. The scanning signals of the second polarity associated with the second through sixth intervals are marked as 64, 66, 68, 70, and 72. The scanning signal 74 of the second polarity represents the transition in going from the bar 40 to the background on the document 32, and consequently, it is not important from the standpoint of character recognition. The tiny spikes 75-1 and 75-2, for example, represent noise spikes which should be eliminated and which are eliminated by thresholding. The thresholding performed may be conventional, for example, to increase the threshold proportionally as high intensity signals are encountered. This avoids false peak detection caused by overshoot and extraneous ink which are common with high intensity prints.

The general method of determining whether an interval is short or long according to this invention is to determine the zero crossing point between a scanning signal of a first polarity and a scanning signal of a second polarity associated with each one of the bars associated with a character to be read. The zero crossing point is determined as the average time between the occurrence of scanning signals of the first and second polarities for each bar comprising a character. The zero crossing point is, in effect, the midpoint of the associated bar of a character. When the zero crossing point for each bar is determined, the distance between the crossing points of adjacent bars is determined, knowing the velocity with which the document 32 moves past the read head 38. Because the bars, like 14 and 16, have the same width, the distance between the zero crossing points of adjacent bars represents the space of long or short interval as previously discussed. This aspect will be discussed in more detail hereinafter.

Some additional details of the circuitry shown in FIG. 1 appear appropriate. The threshold peak and detect circuit 50 is a hardware circuit which continuously keeps looking for a peak (positive or negative) in the data coming from the read head 38 and amplifier 46. As soon as a peak occurs, the circuit 50 initiates a signal to the DMA circuit 52 to store in the RAM 54-1 the count from the previous peak and the digital value of that particular peak from the A/D circuit 48. If this is the first peak which is detected, it would be a positive-going peak as earlier explained. The thresholding performed by the circuit 50 eliminates the noise spikes like 75-1 and 75-2. For the moment, it is sufficient to state that the circuit 50 has a counter 76 which is used for measuring the elapsed time between adjacent peaks. The system 10 also has a track sensor 78 which is used to detect when the characters to be read approach the read head 38. For example, the output of the track sensor 78 may be at a high level prior to the leading edge of a document 32 approaching the read head 38, and thereafter, the output remains at a low level during the reading of the characters on the document 32.

The system 10 also includes a memory array 80 which is part of the RAM 54-1. The array 80 (FIG. 3) is used to store counts and the peak values of the peaks determined in reading a character. The starting location of the data to be included in the array 80 may be "x", for example. The count from a previous peak is stored at location x in the array 80 while the value of the associated peak is stored at location x+1. In the embodiment described, the count and value shown in the array 80 each occupy 8 bits or one byte of memory space. This was done to keep the costs of memory low, for example, although other memory sizes could be used.

Figure 3:
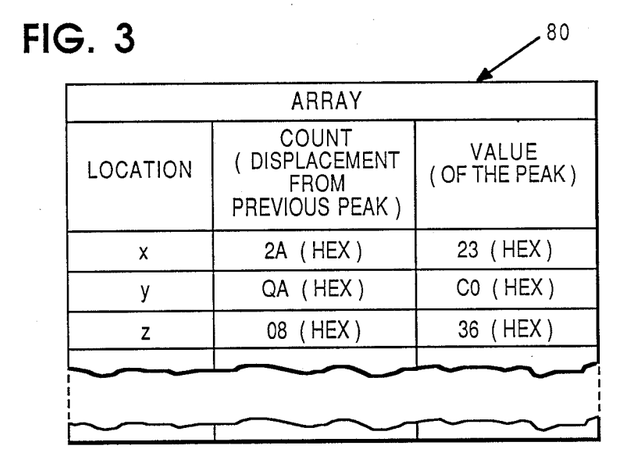
FIG. 3 is a schematic diagram showing what is included in an array included in the system shown in FIG. 1, with some typical values included in the array.

The first count in the array 80 may be 2A (Hex), for example, and the value of the first peak 42 may be, for example, be 23 (Hex). This first count 2A (Hex) is high because it reflects an elapsed time occurring between the leading edge of the document passing the track sensor 78 and the first character on the document 32 being read by the read head 38.

It is desirable to keep track of the progress of the document 32 as it moves along the document track 34. For example, there may be considerable space between groups of characters to be read along the bottom edge of the document. The system 10, as designed, permits the costs of counters and memory used to be kept low and also enables the necessary calculations to be done with small numbers. For example, if the peak detect circuit 50 has not detected any peak within the last 128 counts on counter 76, the circuit 50 will initiate a signal to "transfer" the count to the DMA circuit 52 along with the peak value seen during this time; generally, the peak value at this time is close to zero. In actuality, the output to the DMA circuit 52 which indicates 128 counts is a value of 00; this is because it is simpler for hardware to output 0's and simpler for software to test for 0's.

In order to account for positive and negative peak values within the array 80, the "2s complement of a negative number" is used. FIG. 2 shows a range of positive and negative values. However, in order to simplify the explanation, it is useful to think of a polarity bit as being stored in the array 80 in addition to the count. In addition to the value of each peak stored, a polarity bit is stored for each peak detected. A polarity bit of a binary "0" may be used to indicate a scanning signal of the first polarity, and a binary "1" may be used to indicate a scanning signal of the second polarity (negative peak). The peak data associated with the second peak 44 is placed in the array at location "y" therein. The DMA circuit 52 has a conventional address counter 82 associated with it for placing data in the array 80 as is conventionally done. The counter 82 is incremented by 1 to obtain addresses for storing the next data in the array 80. The address "y" in the array 80 represents a count of two more than the starting address "x", for example, to enable the processor 56 to obtain the data in the array 80. A principal function of the processor 56 is to find the zero crossing points for each of the bars included in a character.

The processor 56 is a conventional processor; however, it is shown in a form which facilitates a showing of the functional relationships of it to the remainder of the system 10. The processor 56 has a ROM 84, a processor (MP) 86, interfaces 88, 90, 92, and 94, and an interface and control logic 96 which interconnects the various elements as shown in FIG. 1. The processor 56 may be controlled by the system controller 98.

The system controller 98 is conventional, and it is shown in a form which facilitates a showing of its relationship to the processor 56. The system controller 98 may have a keyboard (KB) 100, a display 102, a processor (MP) 104, a ROM 106, a RAM 108, an interface 110, and interface and control logic 112 which interconnects the various components as shown to enable the controller 98 to function as a system controller. Data from the processor 56 is transferred from its interface 94 through the interface 110 associated with the controller 98 for use thereby. Various software routines associated with the processor 56 may be downloaded, for example, into the RAM 54 of the processor 56 from the system controller 98.

Figure 4:
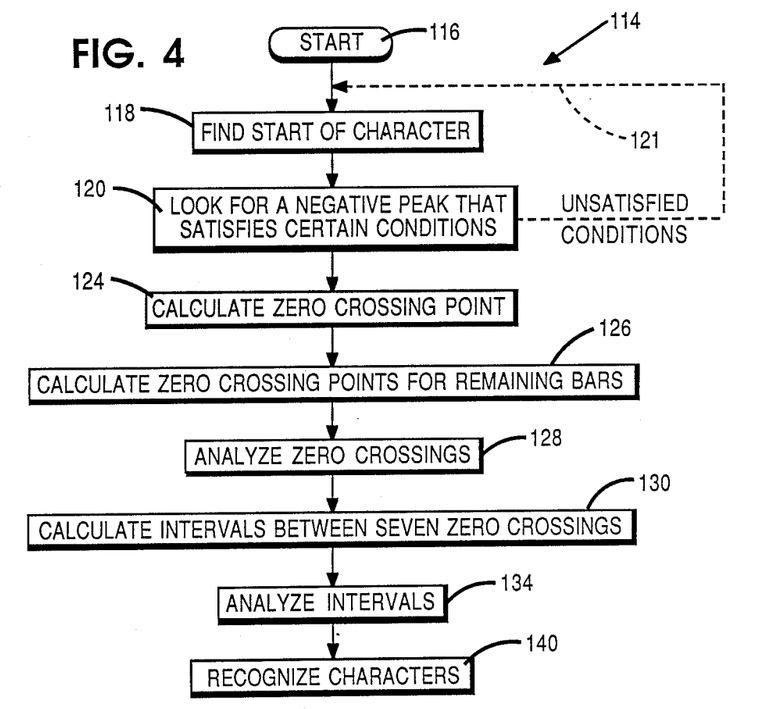
FIG. 4 is a flow chart showing the principal steps used in analyzing the data read from the read head shown in FIG. 1.

After the data about a character being read by the read head 38 is thresholded and stored in the array 80 as previously described, the data is analyzed by the processor 56 to determine the zero crossing points for the bars within a character. Suitable software located in the RAM 54 or ROM 84, for example, is utilized to perform the analysis. A general outline of the routine 114 for performing the analysis is shown in FIG. 4. The means for determining the zero crossing point between a positive peak and a negative peak associated with a bar in a character comprise, generally, the counter 76, the DMA circuit 52, the counter 82, the RAM 54-1, the array 80, the processor 56, and the routine 114.

The routine 114 starts at block 116, and the first step shown by block 118 is to find the start of a character, like 12, for example. Generally, the first positive going pulse or a scanning signal of the first polarity represents the start of a character, and the peak data for the first positive going pulse is found as the first entry in the array 80, shown in FIG. 3. The next step shown by block 120 is to look for a negative peak that satisfies certain conditions. The second address "y" in the array 80 is chained to the first address "x" by the techniques previously mentioned, and this address contains the negative peak digital value and the count associated with the first bar of a character in the example being described. These conditions which are examined are as follows:

1. The first condition states that the distance or interval between the first positive peak and the first negative peak can not be too large. The interval between the positive and negative going peaks for a bar within a character are specified by the predetermined coding being employed. In the example being described, the coding is specified as CMC7 coding. The count which is located at address "y" for this first negative peak reflects the space or interval between the first positive peak and the first negative peak. Because the counter 76 is clocked at a constant rate and because the document 32 is moved at a constant rate past the read head 38 by the document transport 36, the count on the counter 76 reflects the space or interval between successive peaks entered in the array 80.

A count which reflects an interval which is considered "too long" is developed empirically. For example, with the coding mentioned, each character is designed to occupy a space of 0.125 inch from the leading edge of one character to the leading edge of the next character. Another criteria for "laying down" or printing a character is that there must be a minimum amount of space between characters; this means that some of the characters may be more compressed than others and still be within the tolerances set. In the embodiment described, a typical count which reflects a short interval is 19 (decimal), and a typical count which reflects a long interval is 32 (decimal). In the embodiment described, there is a sampling rate of 6 microseconds and a document speed of 104 inches per second, although, of course, other values could be used. Empirically, if a count of 44 (decimal), for example, is obtained, it means that the interval is considered too long. A count which is too long generally means that the count reflects the interval between the trailing edge of the last bar of the character and the leading edge of the next character. Consequently, the character will be rejected, and this data is not used for recognizing the character.

Figure 7A:
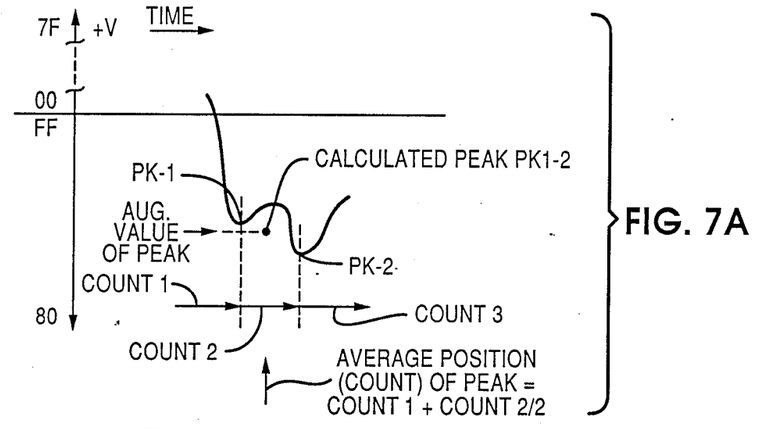
FIGS. 7A, 7B, and 7C show certain types of waveforms having peaks which are analyzed to determine whether or not the peaks represent "noise".

2. The second condition states that the distance or interval between the first positive peak and the first negative peak, in the example being described, can not be too short. In the embodiment described, a count of 5 (decimal), for example, generally indicates that the interval is too short. In this situation, the processor 56 through its software will examine the next entry in the array 80, which entry is "z" in the example being described. If this next entry is for a positive peak, it means that the interval for the first negative peak is too short, and the character will be rejected. If the next entry (z) is also for a negative peak, some additional examination will be performed. Suppose that the two negative peaks being discussed are similar to the peaks 122 and 66 shown in FIG. 2, with peak 122 being the first negative peak encountered. If these two peaks 122 and 66 were of approximately the same height, as shown by peaks PK-1 and PK-2, respectively, in FIG. 7A, their heights would be averaged to obtain an average height for the negative peak. The count in the array 80 associated with the first negative peak PK-1 (FIG. 7A) would be added to the average of the count in the array for the second negative peak PK-2 to arrive at an average position count which reflects the interval between the first positive peak and the first "calculated" negative peak PK1-2 under consideration. In other words the average position count of the peak under consideration=Count 1+Count 2/2 as shown in FIG. 7A. The adding of the counts is done because the counter 76 is reset to zero each time a peak is detected by the threshold peak detect circuit 50.

Figure 7B:
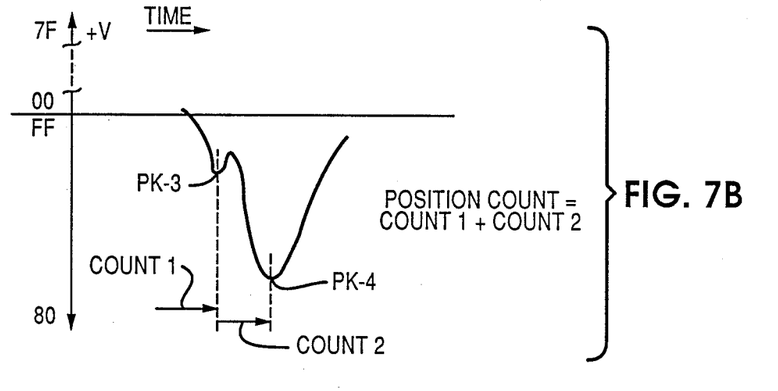

If one of the negative peaks under consideration in the example being discussed is smaller than the other, then a comparison is made. Empirically, if the smaller peak is less than five sixths of the value of the larger peak, than the smaller peak is disregarded as a noise spike. For example, the peak PK-3 shown in FIG. 7B would be disregarted as a noise spike when compared to the peak PK-4. Even though the smaller peak is disregarded from the standpoint of being a peak, the count associated with the smaller peak is added to the count associated with the larger peak to obtain a total count for the "calculated" peak. In other words, the total position count=Count 1+Count 2 as shown in FIG. 7B. In the example being described, the digital value of the negative peak PK-4 and the total position count derived are stored in the RAM 54 of the processor 56.

Figure 7C:
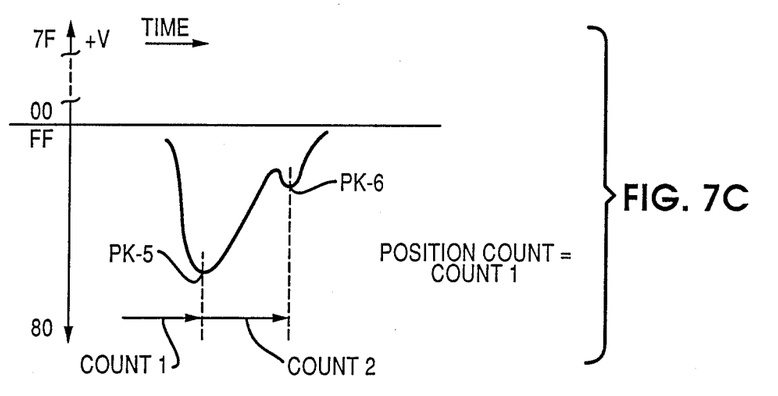

There is one additional condition to be considered; this is reflected in FIG. 7C which shows a large peak PK-5 followed by a small peak PK-6 which is considered noise. In this situation, the value of the peak is that of peak PK-5 alone, and the position count is that of count 1 alone because the peak PK-6 is considered noise. If no negative peak which satisfies the conditions mentioned is found, the routine 114 (FIG. 4) returns to point 117, via the loop shown as dashed line 121, to repeat the process.

The next step in the routine 114 shown in FIG. 4 is to calculate the zero crossing point as represented by block 124. The zero crossing point is calculated by dividing the count between the first positive peak and the calculated negative peak in the example being described. In other words, the zero crossing point refers to the point at which the positive peak or scanning signal of a first polarity changes changes to a negative peak or scanning signal of a second polarity. Geometrically, the zero crossing point relates to the midpoint (as measured along the direction of scanning) of the first bar 14, in the example being described.

The next step in the routine 114 (FIG. 4) is to calculate the zero crossing points (as shown by block 126) for the remainder of the bars associated with a character, like 12. This step 126 also includes the testing mentioned earlier herein with regard to the intervals between the positive and negative peaks being too close or too far.

The next step in the routine 114 (FIG. 4) is to analyze the zero crossing points as shown by block 128. For a properly read character, there are seven bars and seven zero crossing points. If a character read has fewer than seven zero point crossings, it generally means that it is a broken character and should be rejected. In some situations, there may be ink blots, ink spatter, or extraneous ink, etc. at the trailing edges of the bars, for example, which may cause eight zero crossing points to be obtained. When this occurs, software associated with the processor 56 will evaluate the negative peak values of the eight bars to determine whether or not one is much smaller than the other seven bars. This situation occurs typically in relation to ink spatters and the like. In general, the values of the negative peaks are representative of the associated bars. If the value of the smallest negative peak is less than half the value of the next smallest peak, then the smallest peak will be rejected as noise. If the value of the smallest negative peak is not less than half the value of the next smallest peak, then a test is make to see if the last interval (the interval between the seventh and eighth bars) is the longest. If after testing, the last interval is the longest interval, then the first seven bars are considered as comprising the character in question. If the last interval is not the longest interval, then the routine 114 cannot decide which bar is caused by the extraneous ink, and consequently, the character in question is rejected.

Figure 5:
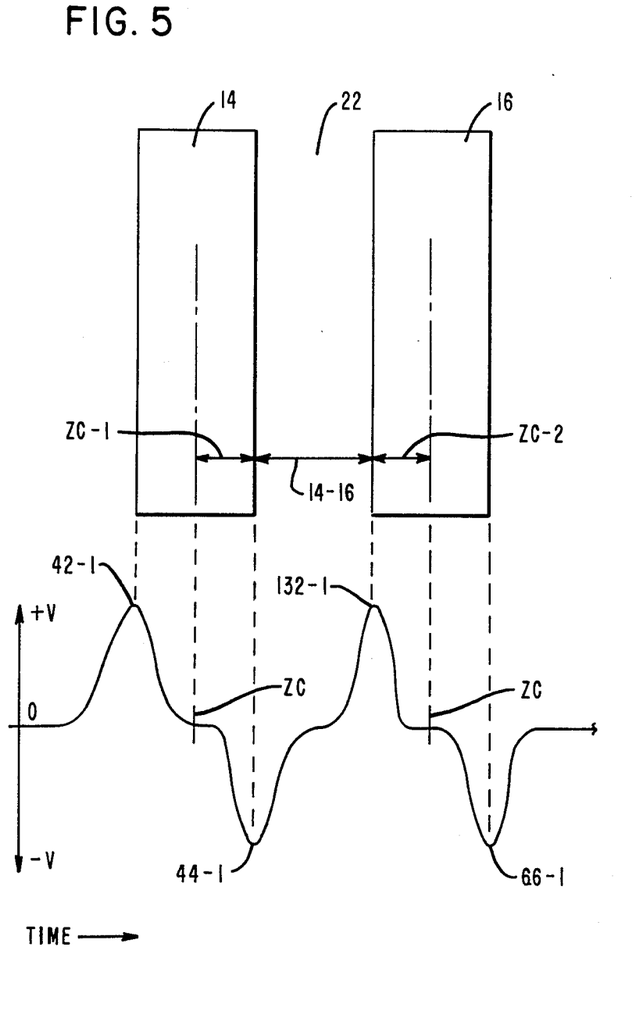
FIG. 5 is an enlarged view of a portion of the character shown in FIG. 2 along with a waveform which is shown in an idealized form to illustrate certain features of the invention.

The next step in the routine 114, shown in FIG. 4, is to calculate the intervals between the seven zero crossings of adjacent bars as shown by the step marked as block 130. The means for measuring the intervals between the zero crossing points of the bars includes, generally, the processor 56 and portions of the routine 114. The procedure for explaining the calculation is best explained in conjunction with FIG. 5. Only the bars 14 and 16 are shown in FIG. 5 for the character 12 shown in FIG. 4, and in addition, the scanning signals of the first and second polarities are shown in very idealized form so as to facilitate a discussion of the calculation of the interval mentioned. The positive peaks 42-1 and 132-1 in FIG. 5 correspond to the peaks 42 and 132, respectively, shown in FIG. 2, and correspondingly, the negative peaks 44-1 and 66-1 are representations of negative peaks 44 and 66. As stated earlier herein, the zero crossing point is half the width of a bar, like 14, and this width is expressed as a count which is marked as ZC-1 in FIG. 5. The count ZC-1 is stored in the RAM 54 of the processor 56. The interval between the trailing edge of bar 14 and the leading edge of bar 16 is derived as a count for the interval between the negative peak 44-1 and the positive peak 132-1; this count which was stored in the array 80 is marked as count 14-16 in FIG. 5. The third element making up the interval between the zero crossing points of adjacent bars 14 and 16 includes the zero crossing count marked ZC-2 associated with the second bar 16. in other words, the total count which reflects the interval between the bars 14 and 16 is calculated by adding up the counts for ZC-1, 14-16, and ZC-2; this total count is stored in the RAM 54 of the processor 56. The remaining intervals between the zero crossing points of adjacent bars comprising a character are calculated as just described. Assuming that the character read is normal, there will be six such intervals associated with that character. These six intervals are identified as intervals #1–#6, for example, and are stored in the RAM 54.

As previously stated, the particular coding described utilizes two long intervals and four short intervals in various combinations. At this time, the system 10 also provides for a check on the "durations" of the intervals to make sure that they are valid. In this regard, the six intervals obtained are analyzed in a step marked as block 134 in FIG. 4. Continuing with the example described in the previous paragraph, the six intervals #1–#6 are stored or ranked from the highest count or interval to the lowest count or interval. After ranking, these counts are analyzed based upon empirical criteria. For example, if the shortest interval or count is too small based on the design parameters of the system 10, the character is rejected. Correspondingly, if the longest interval or count is too large, the character is rejected. The next step is to compare the counts of the two largest intervals to determine whether or not they are within a factor of 1.3 of each other; if they are not, the character is rejected. The next step in the analysis of the interval os to compare the shortest "long" interval and the longest "short" interval to make sure that they are significantly different; if they are not, the character is rejected. Significantly different in this sense means a ratio greater than 1.1.

The final step in analyzing the intervals (block 134 in FIG. 4) is to review the counts corresponding to the intervals between the zero crossing points of the bars of a character, like 12. The following chart lists the spaces between the bars associated with the character shown in FIG. 2 with some sample counts representing the intervals between the associated zero crossing points:

| SPACES | 22 | 136 | 18 | 20 | 138 | 24  |
|--------|----|-----|----|----|-----|-----|
| COUNTS | 20 | 20  | 33 | 32 | 22  | 21. |

The final step is to select the second longest of the "long" intervals for use as a detection point in deciding whether an interval is long or short. From the above chart, the longest interval is represented by a count of 33, and the second longest is 32. This count of 32 is then used in determining whether a count represents a "short" interval. In other words, a count which is 32 or larger represents a long interval, and a count which is less than 32 represents a short interval. By this determination, it is conceivable that a count of 31 would be considered a short interval; however, this situation would not occur because the character would have been rejected earlier under the test that the long intervals and the short intervals are in fact significantly different. By checking on the ratios of the intervals as described, variations in the intervals due to a variation in the speed of the document transport 36 are minimized. This enables the system 10 to work with a wider speed tolerance of the document moving past the read head 38 than some prior art systems. This is a feature of this invention.

After the intervals are analyzed (block 134) as discussed in relation to the the routine 114 shown in FIG. 4, the bars and intervals derived from the example being described are then submitted to conventional character recognition techniques (block 140) by the processor 56. The results of the characters read may then be forwarded to the system controller 98, for example, for use by the system 10.

Figure 6:
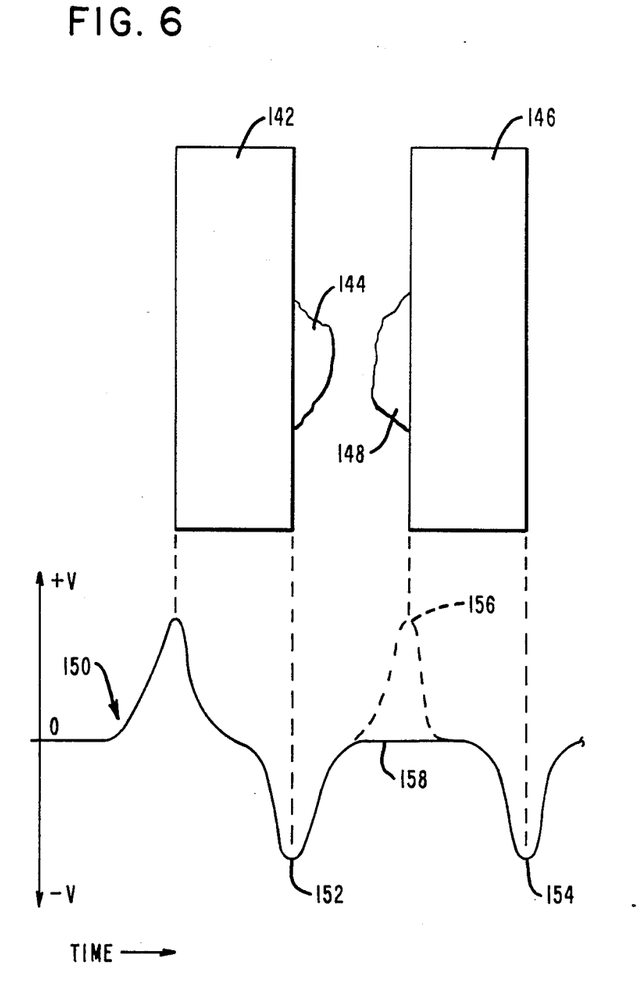
FIG. 6 is a schematic view, similar to FIG. 5 showing a condition which occurs with certain kinds of ink spatter.

There is one situation in which the system 10 does not recognize characters as well as the prior art system which determines the intervals between bars from the trailing edge of one bar 142 (negative peak 152 in FIG. 6) to the trailing edge of the next successive bar 146 (negative peak 154 in FIG. 6). This situation occurs generally whenever there are "touching bars". Another way of stating this situation is that there is ink spatter, for example, extending from the trailing edge of one bar to the leading edge of the next succeeding bar.

FIG. 6 shows such a touching bars situation. Notice that bar 142 has an ink spatter 144 on its trailing edge and the next successive bar 146 has an ink spatter 148 on its leading edge. The waveform 150 produced by the read head 38 in this case has two negative peaks 152 and 154 which are used in the trailing-edge-to-trailing-edge method of determining the interval; however, there is no positive peak 156 (shown in dashed outline) generated. The ink spatters 144 and 148 result in the general flat area 158 instead of producing the missing positive peak 156.

The reason for the missing positive peak 156 is outlined as follows. A positive peak results when there is a major change from a blank area to an area which contains magnetic ink. If there is no change in the amount of ink in an area being traversed, there will be no positive pulse. The ink spatters 144 and 148, which are located between the bars 142 and 146 shown in FIG. 6, in effect, provide a constant amount of ink between these bars, and consequently, there is no positive peak generated, but there is the flat area 158 generated as alluded to earlier herein. The read head 38 generally has a single reading slot which extends along the height of a character to provide the waveforms as shown.

In contrast with the generation of a positive peak just discussed, a negative peak results when there is a decrease in magnetic ink in going from the inked bar to a blank space. It appears that the read head 38 is more sensitive to a transition going from an inked area to a blank area than the reverse. Consequently, a negative peak is generally obtained; however, a positive peak may not be produced, or, if it is produced, it may get thresholded out by being mistaken for noise.

With regard to the system 10, it is necessary to have all the existing positive peaks in the system 10 for the reasons already described with regard to obtaining counts, whereas by the prior art method, the negative peaks 152 and 154 are the ones which are used. Another way of stating the idea is that it is possible to lose data in the inked area, but it is not possible to lose data in the white area.

After the long and short intervals for a character are determined and stored in the RAM 54 of the processor 56, a conventional routine (stored in the RAM 54) and the processor 56 are used to effect character recognition. The character data obtained is then forwarded to the system controller 98, assuming that all the data is read correctly.

After all the characters, like 12, on a document being read are run through the system 10 as described, there will be some characters which are rejected for the reasons given earlier herein. Those characters which are rejected have all their associated data stored in the RAM 54. For these characters, the reading is conducted in a post processing phase according to the prior art method (trailing edge to trailing edge) described. At this time, the document 32 is still moving in the document track 34, however, the associated data for the rejected characters may be withdrawn from the RAM 54 for the post processing mentioned. If these rejected characters are read successfully by the prior art method, then the correctly read characters will be used in place of the characters which were rejected under the new way of reading in system 10. Consequently, the document 32 need not be rejected. If the rejected characters were not read correctly, also, by the prior art method, then the document 32 on which the rejected characters appeared, would be rejected by the system controller 98.

What is claimed is:

1. In a system for recognizing characters with each character having a predetermined number of parallel bars separated by intervals dimensioned as long and short intervals according to a predetermined pattern, a method for determining the widths of said intervals for use in character recognition, comprising the steps:
   (a) scanning said characters in a direction which is substantially perpendicular to said parallel bars for producing a scanning single having a first polarity when the scanning means scans the leading edge of each of said bars, and also for producing a scanning signal having a second polarity when the scanning means scans the trailing edge of each of said bars;
   (b) determining peaks in said scanning signals of said first and second polarities;
   (c) determining a zero crossing point between a said peak of said first polarity in a scanning signal and a said peak of said second polarity in the scanning signal associated with each one of said bars for a character; and
   (d) measuring the intervals between the zero crossing points of said bars to determine whether a long or short interval exists between the parallel bars making up a character.

2. The method as claimed in claim 1 in which said determining step c includes the step of:
   (c-1) storing the values of said peaks and also storing counts which correspond to the distances or intervals between said peaks.

3. The method as claimed in claim 2 in which said measuring step d includes the steps of:
   (d-1) determining whether any of said intervals is longer than one of said intervals dimensioned as a long interval according to said predetermined pattern; and
   (d-2) if one of said intervals is longer as defined herein, rejecting the associated said character.

4. The method as claimed in claim 3 in which said measuring step d includes the steps of:
   (d-3) determining whether any of said intervals is shorter than one of said intervals dimensioned as a short interval according to said predetermined pattern; and
   (d-4) if one of said intervals is shorter as defined herein, rejecting the associated character.

5. The method as claimed in claim 4 in which said measuring step d includes the steps of:
   (d-5) ranking said counts corresponding to said intervals from the lowest count to the highest count; and
   (d-6) selecting the second highest count as representing the dividing line between a long and short interval.

6. The method as claimed in claim 5 in which said measuring step d includes the steps of:
   (d-7) classifying said counts as long intervals if they are equal to or greater than said second highest count; and
   (d-8) classifying said counts as short intervals if they less than said second highest count.

7. In a system for recognizing characters with each character having a predetermined number of parallel bars separated by intervals dimensioned as long and short intervals according to a predetermined pattern, a method for determining the widths of said intervals for use in character recognition, comprising the steps:
   (a) scanning said characters in a direction which is substantially perpendicular to said parallel bars for producing a scanning signal having a first polarity when the scanning means scans the leading edge of each of said bars, and also for producing a scanning signal having a second polarity when the scanning means scans the trailing edge of each of said bars;
   (b) determining peaks in said scanning signals of said first and second polarities;
   (c) determining a zero crossing point between a said peak of said first polarity in a scanning signal and a said peak of said second polarity in the scanning signal associated with each one of said bars for a character; and
   (d) measuring the intervals between the zero crossing points of said bars to determine whether a long or short interval exists between the parallel bars making up a character;
   (e) rejecting those characters whose intervals cannot be determined by steps c and d;
   (f) measuring the intervals between the trailing edge of one bar to the trailing edge of the next adjacent bar for those bars associated with a character rejected at step e to determine whether a long or short interval exists between the parallel bars making up the rejected character from step e.

8. The method as claimed in claim 7 in which said steps a through d are effected while a document carrying said characters thereon is moving in a document track.

9. The method as claimed in claim 8 in which said measuring step f is effected after a character is rejected while using said steps c and d.

10. In a system for recognizing characters with each character having a predetermined number of parallel bars separated by intervals dimensioned as long and short intervals according to a predetermined pattern, an apparatus for determining the width of said intervals for use in character recognition, comprising:
   scanning means for scanning said characters in a direction which is substantially perpendicular to said parallel bars for producing a scanning signal having a first polarity when the scanning means scans the leading edge of each of said bars, and also for producing a scanning signal having a second polarity when the scanning means scans the trailing edge of each of said bars;
   first means for determining peaks in said scanning signals of said first and second polarities;
   second means for determining a zero crossing point between a said peak of said first polarity in a scanning signal and a said peak of said second polarity in the scanning signal associated with each one of said bars for a character; and
   third means for measuring the intervals between the zero crossing points of said bars to determined whether a long or short interval exists between the parallel bars making up a character.

11. The apparatus as claimed in claim 10 in which said first means includes a threshold means for thresholding said scanning signals of said first and second polarities to obtain thresholded scanning signals which exceed a predetermined level, and in which said first means also includes an A/D converter for converting said thresholded scanning signals to digital values.

12. The apparatus as claimed in claim 11 in which said second means comprises:
   counting means for determining a count which reflects an interval between said thresholded scanning signals of said first and second polarities for a character;
   storing means for storing said counts and said digitized values for said thresholded scanning signals; and
   calculating means for determining zero crossing points for each of said bars in a character by using said counts and said digitized values of said thresholded scanning signals.

* * * * *

UNITED STATES PATENT AND TRADEMARK OFFICE
CERTIFICATE OF CORRECTION

PATENT NO. : 4,845,348

DATED : July 4, 1989

INVENTOR(S) : Benedict C. M. Ho et al.

It is certified that error appears in the above-identified patent and that said Letters Patent is hereby corrected as shown below:

Column 14, line 23, delete "determined" and substitute --determine--.

Signed and Sealed this

Twenty-seventh Day of March, 1990

Attest:

JEFFREY M. SAMUELS

Attesting Officer

Acting Commissioner of Patents and Trademarks